United States Patent [19]

Hosterman

[11] 4,326,123
[45] Apr. 20, 1982

[54] TELEPHONE CREDIT CARD SYSTEM

[75] Inventor: Harry L. Hosterman, Akron, Ohio

[73] Assignee: Charles Graham, Guatamala City, Guatemala

[21] Appl. No.: 123,904

[22] Filed: Feb. 22, 1980

[51] Int. Cl.³ .............................................. G06K 5/00
[52] U.S. Cl. .................................. 235/380; 235/382; 179/6.3 CC; 179/6.02
[58] Field of Search ............................... 235/380, 382; 179/6.3 CC, 183, 2 DP, 6.02

[56] References Cited

U.S. PATENT DOCUMENTS

| 3,959,607 | 5/1976 | Vargo | 179/183 |
| 3,985,998 | 10/1976 | Crafton | 235/380 |
| 4,017,835 | 5/1977 | Randolph | 235/380 |

FOREIGN PATENT DOCUMENTS

1442883  7/1976  United Kingdom .......... 179/6.3 CC

*Primary Examiner*—Harold I. Pitts
*Attorney, Agent, or Firm*—Oldham, Oldham, Hudak & Weber Co.

[57] ABSTRACT

The invention relates to a device that can read numerical information from a credit card, interfaced with a general purpose digital computer for automatic credit card validation and/or dialing approaches to include through the computer charge and billing information in conjunction with the credit card utilized. The entire system is automatic and eliminates telephone operator intercept. It can be utilized in conjunction with an automatic telephone dialing equipment. There are unique characteristics in the credit card itself which might be either visual, mechanical, or magnetically validated, and wherein the validation equipment preferably has no moving parts to eliminate breakdown problems.

3 Claims, 10 Drawing Figures

TELEPHONE CREDIT CARD SYSTEM

BACKGROUND OF THE INVENTION

There have been other attempts of incorporating some type of coded ticket or card-reader apparatus with telephone equipment such as U.S. Pat. Nos. 3,784,793 and 3,929,278, but none of these is a credit card arrangement operating in conjunction with a general purpose computer to eliminate operator intercepts on toll calls. Further, none of these apparatus incorporate the concept of using automatic dialing associated with the card, and numerous flexible arrangements for storing data on and reading it from the card which can be utilized with a card reader having no moving parts. Other general patents of interest in the supervised-type telephone or intercommunication systems include the following: U.S. Pat. Nos. 3,499,115; 3,511,939; 3,524,931; 3,725,601; 3,728,493; 3,931,478; 4,054,756; and 4,081,614. None of these, however, utilize a credit card in a manner proposed by applicants to eliminate operator intercept, nor do they utilize the type of card readout contemplated and wherein card readout is accomplished with apparatus having no moving parts.

OBJECTS OF THE INVENTION

Therefore, the general object of the present invention is to provide a device that can read numeral information from a credit card. Numerical information on the card has the receiving phone number, an individual's credit card number, and any other numerical information required. The information read from the card by the apparatus of the invention is transmitted to a general purpose digital computer for recording or validating the information read therefrom, and making arrangements to conduct some type of telephonic communications, including the recording of time charges, or anything else appropriate, and preparation of suitable billing or tabulation of the information generated.

A further object of the invention is that the credit cards themselves would preferably be of standard size, made of plastic or metal, could utilize magnetically, optically with punched holes or colors, or mechanical actuation. For more security, additional digits can be dialed or "touch-toned" in case the card is lost.

A further object of the invention is that the care reader and validator utilizes no moving parts, is fast, accurate, and relatively inexpensive.

A further object of the invention is to incorporate the credit card reader and credit card itself in conjunction with a general purpose digital computer to give the telephone a greater flexibility, versatility, and eliminate operator intercepts to complete long distance calls and record billing and pertinent number information.

A further object of the invention is to incorporate a credit card reader with automatic dialing equipment to facilitate dialing frequently used numbers with a credit card recorder, thus conserving time and ensuring greater accuracy.

The aforesaid objects of the invention and other objects which will become apparent as the detailed description proceeds are achieved by providing a credit card, a credit card reader to validate numerical data and information stored on the credit card, a general purpose digital computer to receive the information from the credit card reader, record the same, and provide interface with a telephonic network, and means to record time and numerical data necessary in conjunction with the call so as to charge it to the credit card number validated.

BRIEF DESCRIPTION OF THE DRAWINGS

For a better understanding of the invention, reference should be made to the accompanying drawings wherein.

DETAILED DESCRIPTION OF THE PREFERRED EMBODIMENT

Figure 1:
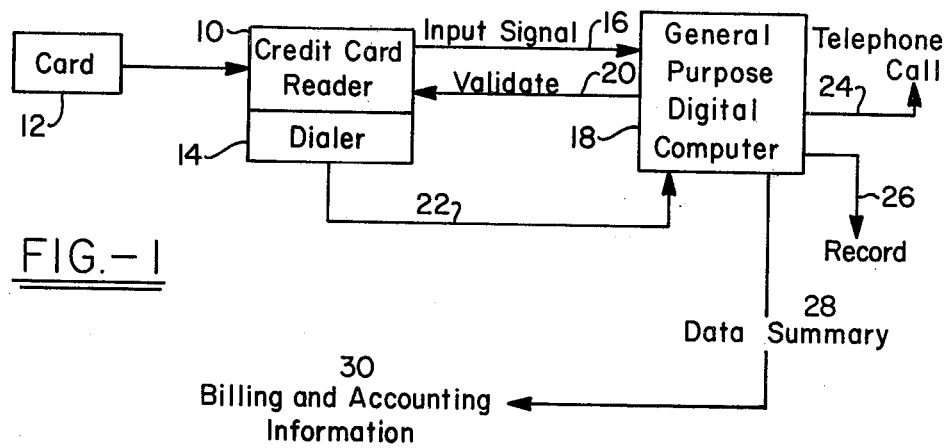
FIG. 1 is a block diagram indicative of the overall system incorporating the card, reader, automatic dialer and general purpose digital computer.

With reference to the embodiment of the invention illustrated generally in FIG. 1 of the drawings, the numeral 10 indicates generally a credit card reader which is designed to effect reading of a card input indicated by numeral 12. The detailed description of the reader 10 and card 12 is set forth in more detail hereinafter. Accompanying and operating in connection with the card reader 10 is a dialer 14, which can be of any type currently available on the market simply adapted to be compatible with the credit card reader in a manner that is well understood by one skilled in the art.

In any event, the credit card reader provides an input signal indicated by numeral 16 to a general purpose digital computer 18 where the signal is processed to determine validity which may send a return signal 20 back to the reader signaling further readout or authorizing actuation of the dialer 14 which then can send a signal 22 into the computer for transmission via signal 24 to effect a telephone call. The information from the call as to time, charges, number called, etc., is then passed back as a signal 26 into the computer to provide data summary information 28 and billing and accounting information 30 as desired.

Hence, the general concept of the invention is the combination of the credit card with the reader, an optional automatic dialer association, and signal communications back and forth and between the reader and the general purpose computer.

Figure 2:
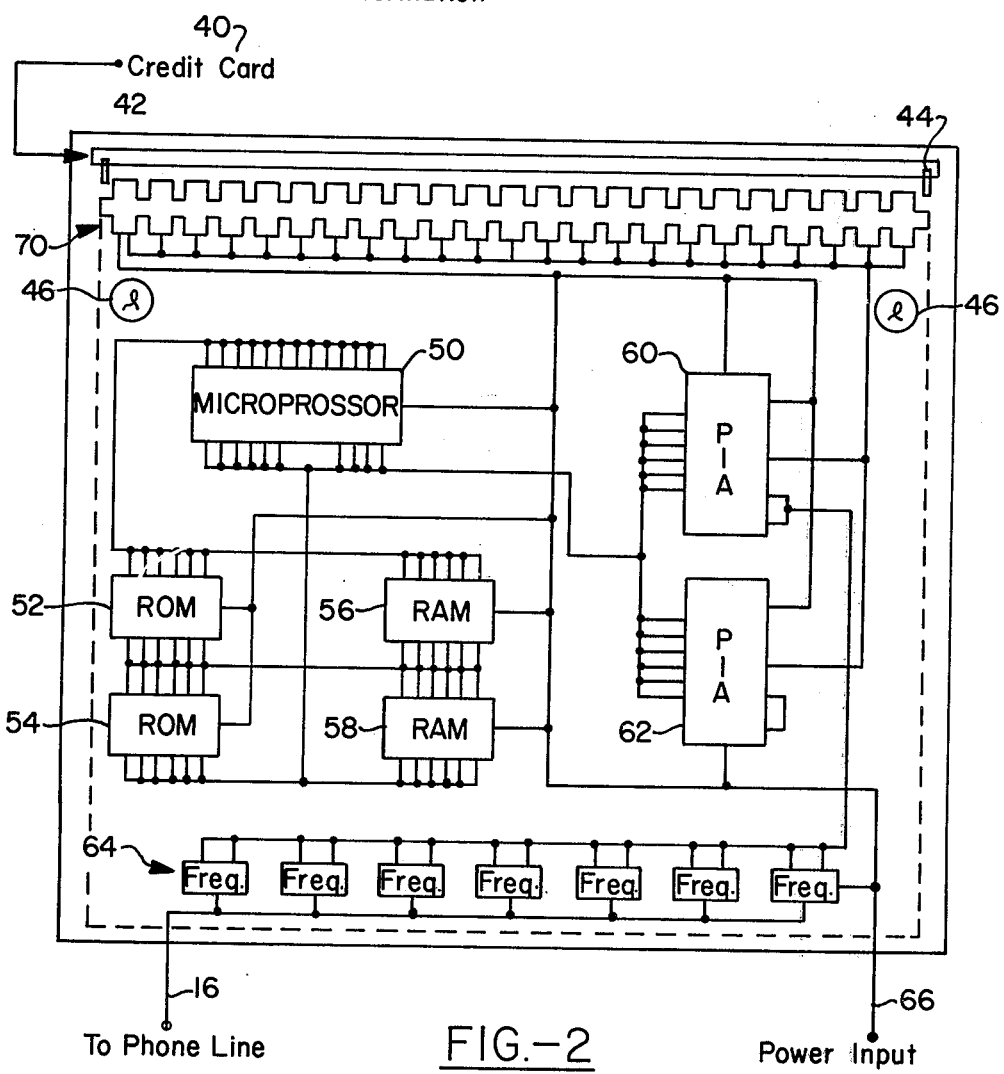
FIG. 2 shows the mechanical breakdown of a card holder and microprocessor board associated with the signal readout from the credit card.

FIG. 2 shows the card holder and microprocessor board. It is desired to achieve the objects of the invention that all of the cards have a row of signals below the number area. Insertion of the credit card indicated by numeral 40 in FIG. 2 turns on respective switches 42 and 44 at each end of the card. The swiches 42 and 44 turn on indicator lights 46 which are positioned on the outside of the top of the card reader case, indicating to the individual that the card has been properly inserted. These switches 42 and 44 also start the microprocessor wherein it is programmed to start by reading the first of the signal row beneath the number area. If there is no number above it, the first signal would not give an input. The program then moves to the second signal input. Assuming it gives a number above it, the program moves to a number reading subroutine. It reads the number signals and goes to subroutine that represents the number. This subroutine turns on the proper frequency generators for its number. The frequency generator outputs are attached to the phone line, so it will be transmitted through the phone line, and this is the line 16 connected to the general purpose digital computer of FIG. 1. The program has a timer subroutine that will keep the frequency on for the proper time. After the proper time, the program returns to the next signal row input. If there is a next number, the microprocessor program goes to a subroutine for a different number. This procedure continues to the end of the signal row, reading signals where there is a signal, and proceeding if there is not. It will also read and send through the phone line 16 in the same way. Basically, the microprocessor is indicated by numeral 50 and it includes appropriate ROMS 52 and 54, RAMS 56 and 58, and PIA's 60 and 62, these connected to appropriate frequency circuits indicated generally by numeral 64. Power to the unit is provided by a power input line 66, and of course the readout is through the optical sensors indicated generally by numeral 70. It should be understood, however, that the sensors 70 could indeed be magnetic sensors or mechanical sensors to adapt the system for these different types of readout.

The microprocessor 15 is also programmed to read out letters in the same way as the numbers. Sometimes the area code numbers are not used, depending if it is a local transmission or long distance, and if they should not be transmitted, a small cover is fastened over the area code number signals and the signal row on the card before it is inserted. After insertion, the program will not send the numbers above the covered signal rows because the sensors will not see them.

All the cards operate in the same manner, with the inputs simply requiring a different sensor 70. The program may require a minor change because some inputs may be of high or low voltage, and this can be readily accomplished by appropriate programming well known to those skilled in the art.

As indicated earlier, the transmissions over line 16 operate the computer for storing and acting upon the information. If there is some additional information that is not on the card which wants to be sent by the individual, the program can also operate to pass on signals from the phone keys without disconnecting the sending microprocessor 50.

Figure 3:
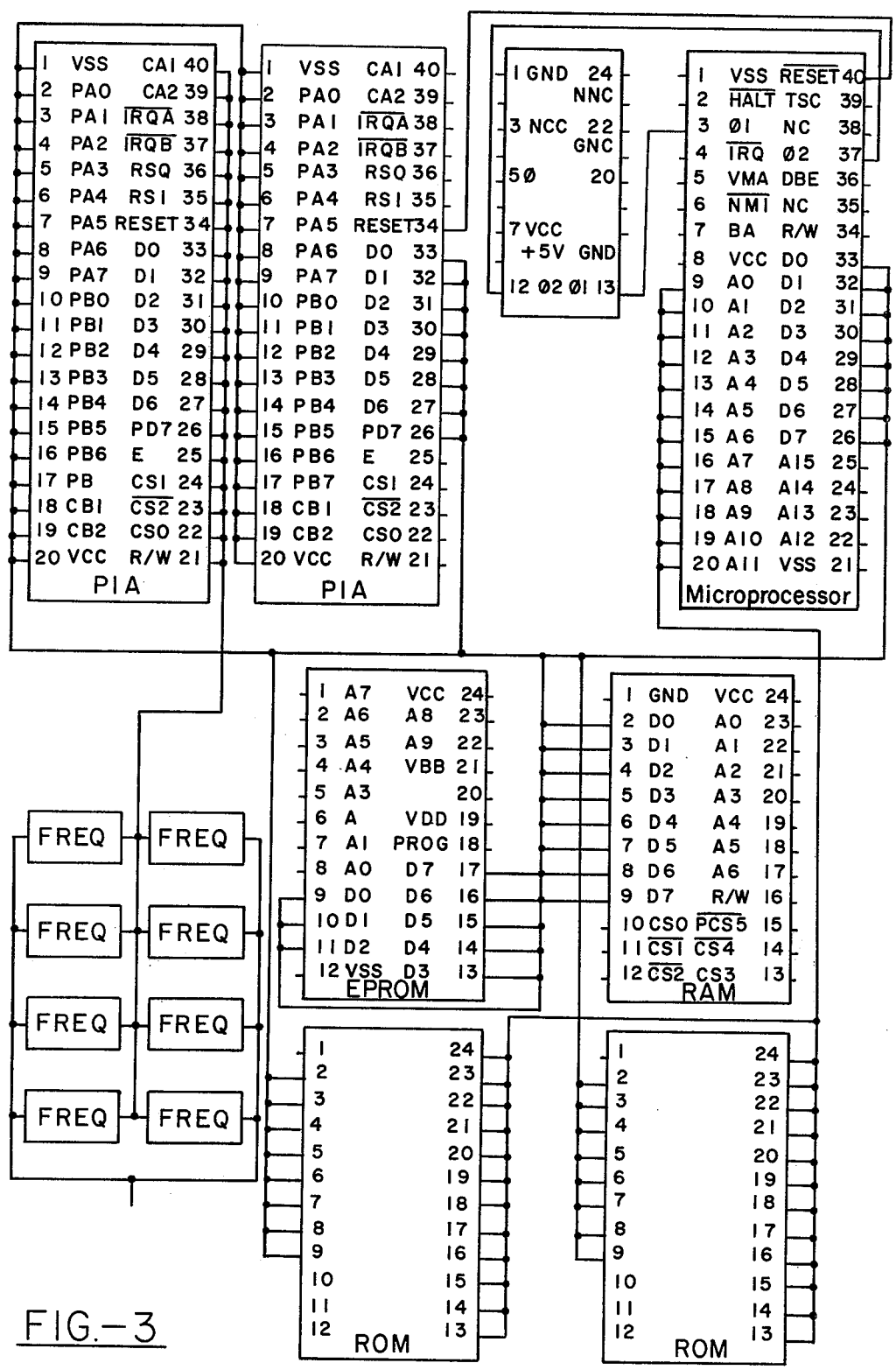
FIG. 3 shows a microprocessor and peripheral units with which the microprocessor reads card information.

The particular program associated with the components comprising the two RAMS, the two ROMS, and the PIA of FIG. 2 is shown in greater detail in FIG. 3, all in a manner with interconnections shown that is understood by those skilled in the art.

Figure 4:
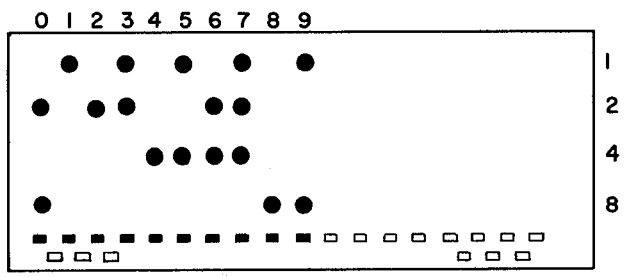
FIGS. 4 through 8 are plan view schematics of different types of credit cards to be associated with the system.

The credit cards have all the number information in the following methods:

1. The card, FIG. 4, has a binary number system with each bit black. All the bytes are black, with unused bit area bright. The readout optical reflector sensors are stationally positioned in front of each bit, as shown in the readout FIG. 2.

Figure 5:
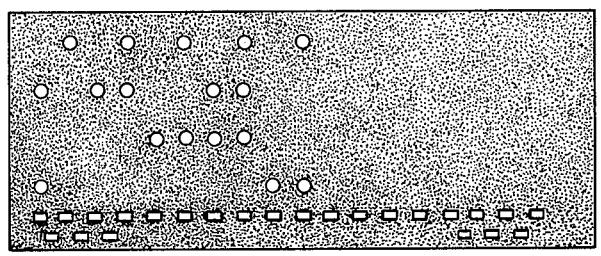

2. The card, FIG. 5, uses the reverse procedure, all the used bits are white, with all the unused bits black. This procedure works the same optical reflector sensors as the previous unit, but with a different program in the microprocessor unit reads out the numbers correctly even though the sensors high and low are opposite. Also, the bits are made of various colors, with color filters on the sensors.

Figure 6:
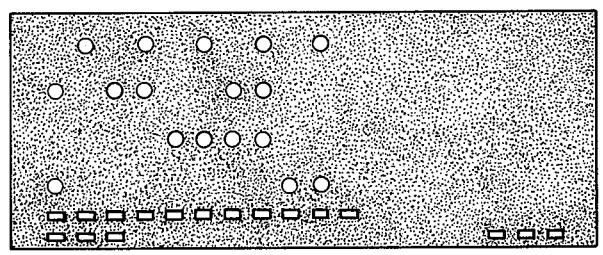

3. The third card, FIG. 6, shows a punched card that has the used bits punched, which activates the optical sensor by the reflection area behind the hole.

Figure 7:
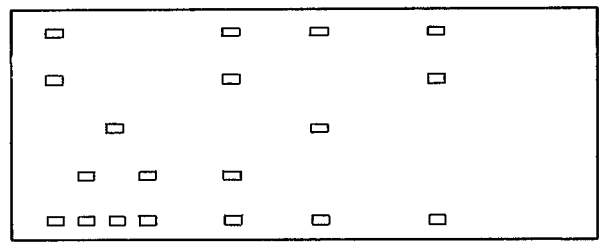

4. The fourth card, FIG. 7, is a stationary magnetic unit. The permanent magnets activate the bit sensors, putting the numerical information into the microprocessor without requiring card movement.

Figure 8:
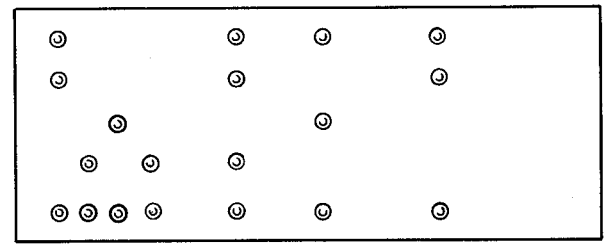

5. The fifth card, FIG. 8 is a card that has a raised section for every bit that is high. It is sent into the microprocessor by the high unit pressing a contact. As shown on a portion of the sketch, a seven segment number is also used as a transmitting system for enabling transmission of any number or letter. This combination is also used on all the previous card systems.

All the cards can transmit all the numerical and letter information desired. In addition to this, all the cards have an invisible magnetic or optical symbol on the lower edge that starts the microprocessor. If an individual made a counterfeit card that looked like the one he copied, the lack of this invisible magnetic symbol would prevent use of a person's card by an individual that had copied it.

Figure 9:
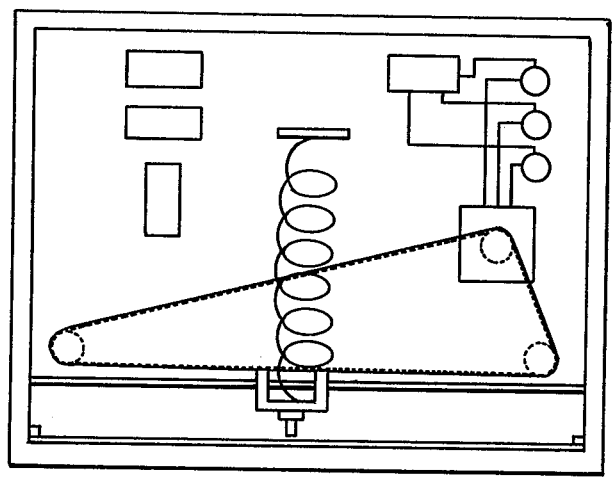
FIG. 9 illustrates a modified embodiment of a moving scan reader for the credit card validator and reader.

FIG. 9 illustrates a moving sensor pickup that alternatively could be utilized to scan the information in the credit card. This system utilizes a simple chain drive to move the scanner up and down along the track with a flexible electrical lead from the scanner connected into the detection circuitry, this being similar to that illustrated and described with regard to the nonmoving embodiments set forth above.

Figure 10:
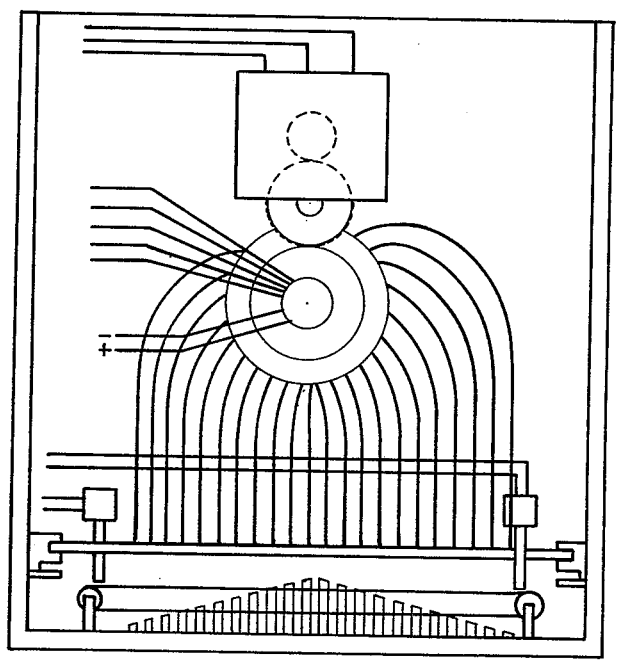
FIG. 10 illustrates a modified embodiment of the reader which utilizes an optical readout system incorporating light transmission over glass lead lines.

FIG. 10 is an optical readout embodiment utilizing a plurality of optical transmissions by light through flexible glass strands utilizing a sequential scan from a central rotater mechanism that is mechanically driven. There is, however, no movement of the card or any scanning sensor and, hence, this arrangement is simple and substantially mechanically free from operating defects.

The particulars of the program to be utilized in the embodiment of the invention illustrated in FIG. 1 and the circuit arrangement of FIG. 2 is substantially as follows:

| TELEPHONE CONTROL PROGRAM FOR CREDIT CARD | | | | | |
| --- | --- | --- | --- | --- | --- |
| BOTH PIA'S INITIALIZATION ROUTINE | | | | | |
| 8000 | 86 | LDA A (IMM.) | 801A | 00 | (Data Dir. Reg. A) |
| 8001 | 00 | | 801B | B7 | STA A |
| 8002 | B7 | STA A | 801C | 30 | (PIA 2) |
| 8003 | 0C | (PIA 1) | 801D | 02 | (Data Dir. Reg. B) |
| 8004 | 01 | (Control Reg. A) | 801E | 86 | LDA A |
| 8005 | B7 | STA A | 801F | 37 | (IMM.) |
| 8006 | 0C | (PIA 1) | | | |
| 8007 | 03 | (Control Reg. B) | 8020 | B7 | STA A |

-continued

TELEPHONE CONTROL PROGRAM FOR CREDIT CARD

| | | | | | | | | |
|---|---|---|---|---|---|---|---|---|
| 8008 | B7 | STA A | | | 8021 | 0C | | |
| 8009 | 30 | (PIA 2) | | | 8022 | 01 | | |
| | | | | | 8023 | B7 | STA A | |
| 800A | 01 | (Control Reg. A) | | | 8024 | 0C | | |
| 800B | B7 | STA A | | | 8025 | 03 | | |
| 800C | 30 | (PIA 2) | | | 8026 | B7 | STA A | |
| 800D | 03 | (Control Reg. B) | | | 8027 | 30 | | |
| 800E | 86 | LDA A (IMM.) | | | 8028 | 01 | | |
| 800F | FF | | | | 8029 | B7 | STA A | |
| 8010 | B7 | STA A | | | 802A | 30 | | |
| 8011 | 0C | (PIA 1) | | | 802B | 03 | | |
| 8012 | 00 | (Data Direction Reg. A) | | | 802C | 86 | LDA A (IMM.) | |
| 8013 | B7 | STA A | | | 802D | 00 | | |
| 8014 | 0C | (PIA 1) | | | 802E | B7 | STA A | |
| 8015 | 02 | (Data Dir. Reg. B) | | | 802F | 0C | (PIA 1) | |
| 8016 | 86 | LDAA | | | | | | |
| 8017 | F0 | (IMM.) | | | 8030 | 00 | (Peripheral Reg. A.) | |
| 8018 | B7 | STA A | | | 8031 | B7 | STA A | |
| 8019 | 30 | (PIA 2) | | | 8032 | 0C | (PIA 1) | |
| | | | | | 8033 | 02 | (Peripheral Reg. B) | |
| 8034 | B7 | STA A | | | 8050 | BD | JSR | |
| 8035 | 30 | (PIA 2) | | | 8051 | 80 | (Timing Subroutine) | |
| 8036 | 00 | (Peripheral Reg. A) | | | 8052 | 9C | | |
| 8037 | B7 | STA A | | | 8053 | 4A | DEC A | |
| 8038 | 30 | (PIA 2) | | | 8054 | 2D | BLT | |
| 8039 | 02 | (Peripheral Reg. B) | | | 8055 | 08 | | |
| 803A | 0E | CLI | | | 8056 | B7 | STA A | |
| | | | | | 8057 | 0C | | |
| 803B | 01 | NOP | HOLD ROUTINE | | 8058 | 00 | | |
| 803C | 01 | NOP | AFTER PIA | | 8059 | F6 | LDA B (Ext.) | |
| 803D | 3E | WAI | INITIALIZATION | | | | | |
| | | | | | 805A | 30 | | |
| 803E | 86 | LDAA | ROUTINE FOR ENTERING | | 805B | 02 | | |
| | | | | | 805C | 20 | BRA | |
| 803F | 09 | | FIRST NUMBER | | 805D | E6 | | |
| | | | | | 805E | 86 | LDAA | ROUTINE FOR ENTERING |
| 8040 | BD | JSR | | | 805F | 09 | | 2nd NUMBER |
| 8041 | 80 | | INITIAL ZERO NUMBER | | | | | |
| 8042 | 81 | | CHECK ROUTINE | | 8060 | BD | JSR | |
| 8043 | 01 | NOP | | | 8061 | 80 | | |
| 8044 | 58 | ASL 58 | | | 8062 | 8D | | |
| 8045 | 58 | ASL 58 | | | 8063 | 01 | NOP | |
| 8046 | 58 | ASL 58 | | | 8064 | 58 | ASL | |
| 8047 | 58 | ASL 58 | | | 8065 | 58 | ASL | |
| 8048 | F7 | STA B | | | 8066 | 58 | ASL | |
| 8049 | 30 | (PIA 2) | | | 8067 | 58 | ASL | |
| | | | | | 8068 | F7 | STA B | |
| 804A | 02 | (Peripheral Reg. B) | | | 8069 | 30 | | |
| 804B | C6 | LDA B | | | | | | |
| 804C | F0 | (IMM.) | | | | | | |
| 804D | F7 | STA B | | | | | | |
| 804E | 0C | (PIA 1) | | | | | | |
| 804F | 02 | (Peripheral Reg. B) | | | 8081 | B7 | STA A | |
| 806A | 02 | | | | 8082 | 0C | | |
| 806B | C6 | LDA B | | | 8083 | 00 | | CHECK CARD FOR |
| 806C | F0 | | | | 8084 | 4A | DEC A | FIRST NUMBER |
| 806D | F7 | STA B | | | 8085 | F6 | LDA B | ZEROES SUBROUTINE |
| 806E | 0C | | | | 8086 | 30 | | |
| 806F | 02 | | | | 8087 | 02 | | |
| | | | | | 8088 | C1 | CMP | |
| 8070 | BD | JSR | | | 8089 | 00 | | |
| 8071 | 80 | | | | 808A | 27 | BEQ | |
| 8072 | 9C | | | | 808B | F5 | | |
| 8073 | 4A | DEC A | | | 808C | 39 | RTS | |
| 8074 | 2D | BLT | | | | | | |
| 8075 | 08 | | | | 808D | 01 | NOP | CHECK CARD FOR |
| 8076 | B7 | STA A | | | 808E | 86 | LDA | INITIAL ZERO |
| 8077 | 0C | | | | 808F | 09 | | SUBROUTINE |
| 8078 | 02 | | | | 8090 | B7 | STA A | (2nd NUMBER) |
| 8079 | F6 | LDA B | | | 8091 | 0C | | |
| 807A | 30 | | | | 8092 | 02 | | |
| 807B | 00 | | | | 8093 | 4A | DEC A | |
| 807C | 20 | BRA | | | 8094 | F6 | LDA B | |
| 807D | E6 | | | | 8095 | 30 | | |
| 807E | 7E | JMP | STOP | | 8096 | 00 | | |
| 807F | 80 | | | | 8097 | C1 | CMP | |
| 8080 | 3C | | ROUTINE | | 8098 | 00 | | |
| | | | | | 8099 | 27 | BEQ | |

-continued
TELEPHONE CONTROL PROGRAM FOR CREDIT CARD

```
                    809A F5
                    809B 39   RTS
809C 01   NOP
809D CE   LDX
809E FF          ⎫  NUMBER ON
809F FF          ⎬  TIMING
80A0 09   DEX    ⎭  SUBROUTINE
80A1 2E   BGT
80A2 FD
80A3 39   RTS
```

Hence, the summary of the program comprises the following steps:
1. Card positioned into receiver to cause actuation;
2. All PIA's initialized;
3. If correct card determined, it goes past WA1, but if not correct card, it goes to subroutine that lights a remove light (this is just that the indicator lights 46 will go off);
4. Routine is processed for entering the first number;
5. A subroutine is accomplished for checking initial zeroes;
6. After any initial zeroes, all the other numbers are read;
7. A subroutine is processed for holding the number output time correct;
8. Routine for entering the second number, and then simply repeat steps 5 through 7 on the second number, and so on through all the numbers;
9. A wait instruction with this providing a tone indication indicating then Step 10 to
10. Proceed to dial the long distance direct-dialed call, or to initiate an automatic dial of up to 20 numbers since the computer is enabled.

In some instances, it may be desirable to operate the basic system without the credit card per se, and in this instance the desired numerical information can be pre-stored in the microprocessor 50 which would include the access number and the actual code identification number. In other words, only the card 12 and the credit card reader 10 would be eliminated, but the microprocessor 50 and all of its associated equipment would store the preprogrammed information to achieve the transmission of the input signal 16, the validate signal 20, as well as the dialing information in association with the general purpose digital computer 18. This eliminates the necessity for the current reader portion only and in some instances may simplify the system and reduce the cost. It may be particularly applicable where it is not necessary to store information on card 12 and would be permanently stored on the attachment to the telephone which would constitute the microprocessor 50 and its associated equipment as best shown in FIG. 2 of the drawings.

This attachment might also be small enough and compact enough to be carried in the same manner as the card 12 and simply attached to any telephone mouthpiece for preprogrammed transmittal of the tone information, thus accomplishing the purpose of the card 12 within the transmitter portion itself.

While in accordance with the patent statutes, only the best known embodiment of the invention has been illustrated and described in detail, it is to be particularly understood that the invention is not limited thereto or thereby, but that the inventive scope is defined in the appended claims.

What is claimed is:
1. A telephone credit card system which includes an automatic dialer including credit card validation information, a general purpose digital computer to receive the information from the dialer, record the same, and provide interface with the telephonic network, and means to record time and numerical data necessary in conjunction with a telephone call to charge it to the credit number validated which is further characterized by: inclusion of a microprocessor to interface between the dialer and the general purpose digital computer operating in conjunction with ROMS, RAMS, and PIA's to transmit signals through the phone line to the general purpose digital computer.

2. A system according to claim 1, wherein the dialer includes the ability to dial a preprogrammed number up to 20 numbers when the general purpose digital computer is enabled.

3. A system according to claim 2, wherein the dialer is adapted to be manually attached to any telephone mouthpiece for preprogrammed transmittal of tone information.

* * * * *